Patented Dec. 25, 1923.

1,478,694

UNITED STATES PATENT OFFICE.

RICHARD HATLEY BERKLEY, OF PLAINVILLE, MASSACHUSETTS, ASSIGNOR TO WHITING & DAVIS COMPANY, A CORPORATION OF MASSACHUSETTS.

MACHINE FOR MAKING LINK MESH.

Application filed December 5, 1921. Serial No. 519,895.

*To all whom it may concern:*

Be it known that I, RICHARD HATLEY BERKLEY, residing at Plainville, in the county of Norfolk, State of Massachusetts, have invented certain new and useful Improvements in Machines for Making Link Mesh; and I do hereby declare the following to be a full, clear, and exact description of the invention, such as will enable others skilled in the art to which it appertains to make and use the same.

This invention relates to machines for making link mesh such as is used in the manufacture of purses.

The manufacture of mesh bags as heretofore conducted has involved considerable waste of link mesh because of the varying widths of the pieces of mesh employed in making bags of different sizes. The mesh is commonly made in large sheets and pieces of the requisite width are cut from these sheets, and when the pieces are of less width than the sheet the surplus is wasted or is utilized only by uniting two or more pieces each too narrow to permit of its use in making a bag.

The object of the present invention is to so improve the construction of machines for making link mesh that sheets of mesh of any desired size may be made thereon with a consequent elimination of the waste of narrow strips of mesh or subsequent operations in uniting two or more such narrow strips.

It has been found heretofore that the type of link mesh machine best adapted for use is one in which the mesh is made in the form of a sleeve, this sleeve being supported upon suitable devices which move it step by step about its axis and arranged in cooperation with a spiral surface whereby the movement of the piece of mesh about its axis is accompanied by movement in the direction of its axis. With such an arrangement of the parts, the links added to the mesh by the link-forming tools are arranged in a spiral around the sleeve of mesh and each step movement of the piece to present to the forming tools a new point for the reception of a ring involves movement both about and in the direction of the axis of the sleeve of mesh. A long sleeve of mesh made on such a machine is cut along a straight line down one side to form a long rectangular strip of mesh from which pieces forming individual bags may be cut.

The improvement constituting the present invention may be utilized in a machine of this type for making mesh in the form of a sleeve. It involves the provision of means whereby sleeves of various diameters may be made upon the machine, a change of a sleeve of one diameter to one of a different diameter being effected by a simple re-arrangement of the parts employed for supporting the sleeve and effecting its step by step movement.

Instead of supporting the sleeve of mesh upon a circular mandrel and provided with a spiral thread upon its surface as has been usual heretofore, a plurality of supporting devices are employed arranged with their axes parallel and supporting the sleeve of mesh by having it pass around all of them and one or more of these several supporting devices is so mounted as to permit it to be moved toward and away from the others thereby varying the diameter of the sleeve of mesh encircling all of the several supporting devices.

Thus, there may be two supporting devices in the form of spools with spiraled threads upon their surfaces and the sleeve of mesh encircling them would be in the form of an oval and by moving one of these spools toward and away from the other the circumferential dimension of the sleeve of mesh could be varied as desired. With such an arrangement of the parts, the two sets of forming tools employed could be arranged side by side in cooperation with the straight length of mesh passing from one spool to the other, or the two sets of forming tools could be arranged opposite each other each operating upon the straight length of mesh passing between two spools. Another arrangement which could be employed is to utilize three spools to support the sleeve of mesh in which case the sleeve would be more or less in the form of a triangle and one of these three spools could be so mounted as to permit of moving it toward and away from a line connecting the other two. In that case, the two sets of forming tools would preferably be arranged side by side in position to cooperate with the straight length of mesh extending between the two spools which were not so mounted as to permit of adjustment of their position.

When the sleeve of mesh is so supported upon a plurality of supporting devices one of which is adjustable, the step by step movement of the piece of mesh may be effected by applying power to one only of the spools, the other or others being allowed to turn about their axes idly or two or more of the supporting spools may be actuated by power step by step.

When two supporting spools are employed, and the power for effecting the step by step movement is to be applied to both of them, the devices employed for applying the power must be specially constructed so as to permit of making the requisite adjustment of the distance between the two spools. When more than two supporting spools are employed, it is preferable to apply power for the step by step movement to two of the spools which are not adjustable relatively and arrange for adjustment of those spools which are not driven by power.

One embodiment of the invention is illustrated in the accompanying drawings, an embodiment in which two supporting spools are employed movable relatively toward and away from each other to permit of making sleeves of mesh of varying circumferential dimensions and both arranged to be driven step by step by power operated devices. It is to be understood, however, that this construction is illustrated and described only as one of the many forms in which the invention may be employed, especially in that the number of rotatable devices for supporting the sleeve of mesh may be changed as desired, and that the power for effecting the step by step movement may be applied to one or any number of these supporting devices, the essential feature of the invention being that a plurality of supporting devices are employed for supporting a sleeve of mesh and that one or more of these devices is made adjustable toward and away from another or others so as to adapt the mechanism for making mesh in the form of a sleeve of any selected circumferential dimension.

In these drawings.

Figure 1:
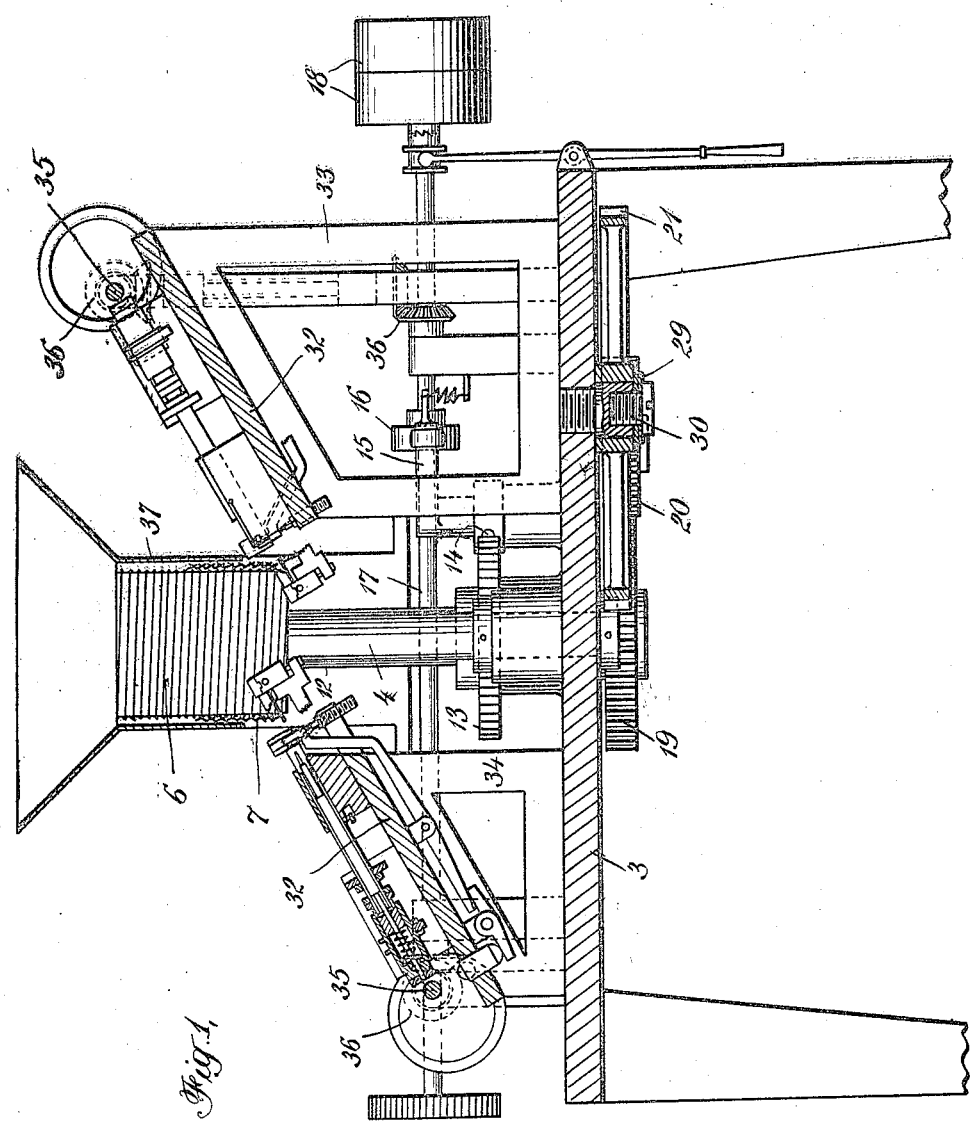
Fig. 1 is a sectional elevation of a mesh making machine along the line 1—1 Fig. 2.
Figure 2:
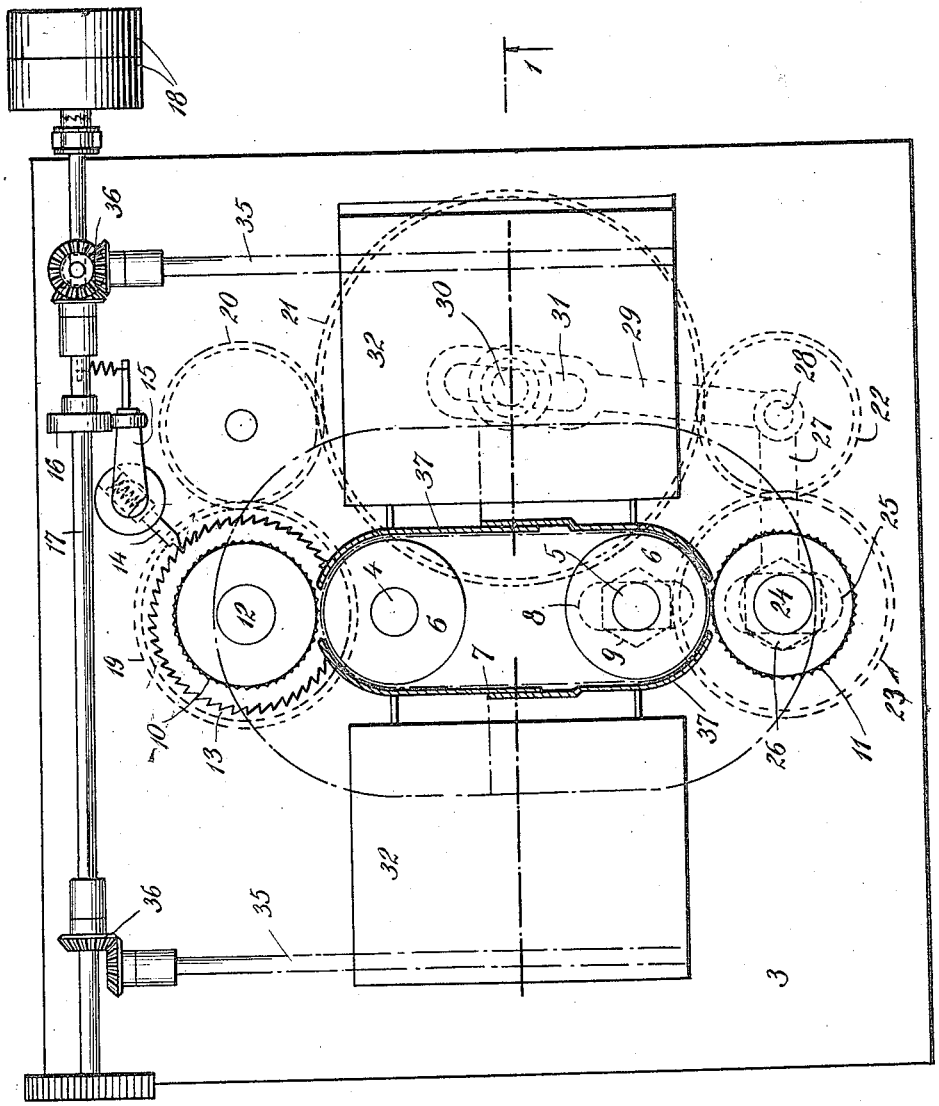
Fig. 2 is a plan view of the machine with certain of the parts removed for the sake of clearness.

Referring to these drawings, 3 indicates a table on which two shafts 4 and 5 are mounted; each of these shafts carries a mesh supporting device in the form of a mandrel 6 which has a spiral thread cut in its cylindrical surface as indicated in Fig. 1. These two mandrels 6 are arranged side by side and form the supporting devices for the sleeve of mesh which is indicated at 7. This sleeve fits snugly upon the two mandrels so that it is in contact with each mandrel over approximately one-half of the cylindrical surface of the mandrel and passes in straight tangential paths from one mandrel to the other. One of the shafts supporting the mandrels, in this instance the shaft 5, is so mounted upon the table 3 as to permit of adjustment of its position toward and away from the shaft 4. For this purpose a slot 8 is indicated in Fig. 2 and shaft 5 may be positioned at any point in this slot and then locked in that position by a nut 9. The position of the mandrel 6 carried by the shaft 5 with respect to the mandrel carried by the shaft 4 will determine the circumferential dimension of the sleeve of mesh upon the machine.

In order to feed the sleeve of mesh step by step about two mandrels, two cylinders 10 and 11 are employed, each provided with lengthwise ridges and depressions upon its surface corresponding with the ridges and depressions in the surface of the mesh formed by the rings thereof. These cylinders 10 and 11 are so positioned that each contacts with the mesh passing around one of the mandrels 6.

The cylinder 10 is mounted upon a shaft 12 which passes through a bearing in the table 3 and carries a ratchet wheel 13. This ratchet wheel is engaged by a pawl 14 operated by an arm 15 which carries a roller contacting with the surface of the cam 16 on the power shaft 17, which shaft is driven by any suitable source as by the fast and loose pulleys 18.

The other cylinder 11 is driven from this ratchet and pawl mechanism through intermediate gearing which is specially constructed to permit of the desired adjustment of the mandrels 6 toward and away from each other. For this purpose, the shaft 12 of the cylinder 10 is shown as provided with a spur gear 19 meshing with an idler gear 20 which meshes with a large gear 21 mounted on suitable stub shafts below the table 3. This larger gear 21 meshes with a gear 22 corresponding to the gear 20 and the gear 22 meshes with a gear 23 carried by the shaft 24 of the cylinder 11. This shaft 24 is mounted for rotation in a bearing which is so mounted upon the table 3 as to permit of adjustment of its position toward and away from the shaft 12 and cylinder 10. For this purpose, a slot 25 is shown as provided in the table 3 and a lock nut 26 is provided whereby the bearing for the shaft 24 may be locked in position when it has been adjusted to the proper point in the length of the slot. A link 27 connects the shaft 24 with the shaft 28 of the idler gear 22 and a similar link 29 connects the shaft 28 with the shaft 30 of the spur gear 21. One end of the link 29 has a lengthwise slot 31 therein through which the shaft of the gear 21 passes. By means of these parts the driving connection from the shaft 12 to the shaft 24 through the gears 19, 20, 21, 22 and 23 may be maintained at whatever may be the position to which the shaft 24 of the cylinder 11 is moved toward and away from the shaft 12. The link 27 serves to hold the gear 22 always in proper mesh with the gear 23. The connection from the link 29 to shaft 30 is released prior to effecting an adjustment of the position of shaft 24 and after the desired adjustment has been secured the link 29 is locked relatively to the shaft 30 in such a position as to hold the gear 22 in proper mesh with the gear 21.

Any desired number of link-forming tools may be employed and these may be arranged in various ways, preferably two sets of link-forming tools are employed, one set making the rings that incline in one direction, and the other the rings that incline in the opposite direction, and when two such sets of tools are employed the spiraled grooves upon the cylindrical surfaces of the supporting rollers 6 are properly formed for coaction with the two. In the present instance, the two sets of link-forming tools are shown as arranged on opposite sides of the sleeve of mesh, each set of forming tools operating on the straight length of mesh passing from one mandrel to the other. If desired, the two sets of forming tools could be arranged side by side operating upon the same straight length of mesh. The construction of the forming tools is shown in some detail in Fig. 1 but illustration and description in detail are unnecessary as these forming tools may be of any desired construction. They are preferably made as illustrated and described in Letters Patent No. 1,317,726 granted October 9, 1919, to A. C. Pratt. In accordance with that patent a set of link-forming tools is constructed as a unit adapted to be mounted upon a suitable support. In Fig. 1 the units are shown as assembled upon suitable base plates 32 mounted on suitable standards 33 and 34. In Fig. 2 the base plates 32 are shown but the parts of the link-forming tools are omitted for the sake of clearness. The tools of each set are operated in the usual manner by the shafts 35 which are shown as connected to the power shaft 17 by bevel gears 36.

In Fig. 1 a shield or cover 37 is shown as enclosing the sleeve of mesh upon the two mandrels 6. Such a cover may be employed if desired but must be so constructed as to adapt itself to the different relative positions of the two mandrels. In this instance, the cover is shown as made of two sheet metal parts which telescope more or less. Also, each part is provided with an opening through which the roller 10 or 11 passes to coact with the mesh passing around the mandrel to effect the step by step feed thereof.

I claim:

1. A mesh machine for making mesh in the form of a sleeve comprising the combination of a plurality of supporting devices for supporting the piece of mesh, means for varying the positions of said supporting devices relative to one another to adapt the machine for manufacture of sleeves of mesh of different sizes, adjustable means for effecting a step by step feed of the sleeve of mesh about the supporting devices, and link forming tools for forming links and adding them to the piece of mesh on the supporting devices.

2. A mesh machine comprising the combination of a plurality of mandrels having spiral grooves formed upon the surface thereof, means for varying the positions of said mandrels relative to one another to adapt them for supporting sleeves of mesh of different sizes, means adjustable in accordance with the variation in position of said mandrels for effecting a step by step feed of a sleeve of mesh about the mandrels and link-forming tools for forming links and adding them to the mesh supported by the mandrels.

3. A mesh machine comprising the combination of a plurality of cylindrical members mounted with their axes in parallel relation and adapted to support a piece of link mesh in the form of a sleeve, means for varying the position of said members relative to one another to accommodate sleeves of different dimensions, means adjustable in accordance with the variation in position of said mandrels for moving the sleeve of mesh step by step about the cylindrical members, and link-forming tools for forming links and adding them to the mesh carried by the cylindrical members, the said forming tools being mounted for coaction with a straight length of mesh extending from one to another of the said cylindrical members.

4. A mesh making machine comprising the combination of a plurality of cylindrical members mounted with their axes in parallel relation and adapted to support a piece of link mesh in the form of a sleeve, means for varying the positions of said members relative to one another to adapt the machine for manufacturing sleeves of mesh of different sizes, means adjustable in accordance with the variation in position of said mandrels for moving a sleeve of mesh step by step about the said members and link forming tools for forming links and adding them to the mesh on the support, the said tools being mounted for coaction with a straight length of the piece of mesh extending from one cylindrical member to another.

5. A mesh making machine comprising the combination of a pair of supporting members for supporting a piece of link mesh in the form of a sleeve, one of said members having a spiral thread upon its cylindrical surface, a cylindrical member mounted opposite one of the said members and provided with axially disposed ridges and depressions for coaction with the mesh passing about the member provided with the spiral thread, means for effecting step by step rotation of the said member provided with the ridges and depressions, and link-forming tools mounted in position to coact with the mesh and adapted to form links and add them to the mesh carried by the said members.

6. A mesh machine for making mesh in the form of a sleeve comprising the combination of a plurality of devices for supporting the piece of mesh, means for varying the positions of said supporting devices relative to one another to accommodate sleeves of mesh of different sizes, means engaging the mesh for effecting a stepwise movement of the sleeve about said supporting devices and link forming tools for forming and adding links to the piece of mesh on the supporting devices.

7. A mesh making machine comprising the combination of a plurality of mandrels for supporting a sleeve of mesh, said mandrels being disposed within the sleeve, means for varying position of said mandrels relative to one another to accommodate sleeves of different dimensions, means engaging the mesh for effecting a stepwise movement of a sleeve about the mandrels and link forming tools for forming and adding the links to the piece of mesh supported by the mandrels.

8. A mesh machine comprising the combination of a plurality of cylindrical members, mounted with their axes in parallel relation and adapted to support a piece of link mesh in the form of a sleeve, means for varying the position of said members relative to one another to accommodate sleeves of different dimensions, means engaging the mesh as it passes over one of said members to move the sleeve of mesh about said members with stepwise movement and link forming tools for forming and adding links to the pieces of mesh supported by said members.

9. A mesh machine comprising the combination of a plurality of cylindrical members mounted with their axes in parallel relation and adapted to support a piece of link mesh in the form of a sleeve, means for varying the position of said members relative to one another to adapt the machines for manufacutring sleeves of mesh of different sizes, means engaging the mesh as it passes over the surface of one of said members to propel it about said members with a stepwise motion, means to adjust the position of last said means with said cylindrical member as the latter is given different positions of adjustment and link forming tools to form and add links to the mesh supported by said members.

10. A machine for making mesh in the form of a sleeve comprising the combination of a plurality of relatively adjustable mandrels adapted to be enclosed by a sleeve of mesh supported thereon, means to vary the relative positions of said mandrels to support sleeves of different dimensions, a driving member engaging the mesh on one of said mandrels and adapted to propel said mesh about said mandrels with a stepwise motion, means to vary the position of said driving member with said mandrels as the position of the latter is varied and link forming tools for forming and adding links to the mesh supported by the mandrels.

11. A machine for making mesh in the form of a sleeve comprising in combination, a plurality of relatively adjustable mandrels adapted to be enclosed by a sleeve of mesh supported thereon, means to vary the position of said mandrels to accommodate sleeves of different dimensions, a cylindrical driving member disposed with its axis parallel to the axis of one of said mandrels and adapted to engage the mesh lying thereon, means to rotate said driving member with a stepwise motion, means to vary the position of said driving member to maintain its contact with the said mesh as said mandrel is given different positions and link forming tools for adding and forming links to the mesh supported by said mandrels.

12. In a machine for making mesh in the form of a sleeve, a rotatable support for a piece of mesh and a cylindrical driven member having its axis parallel to and spaced from the axis of the support, this member being so disposed as to engage the mesh on the support.

13. In a machine for making mesh in the form of a sleeve, a rotatable support for a piece of mesh, and means for moving the mesh on the support, comprising a cylinder having its axis parallel to and spaced from the axis of the support, and having alternate ridges and depressions engaging the links of the mesh, and power driven means for rotating the cylinder.

14. In a machine for making mesh in the form of a sleeve, a pair of rotatable supports for the mesh, these supports being capable of adjustment toward and away from each other, a cylindrical driven member associated with each support and engaging the mesh thereon, these members being also capable of relative adjustment with the supports, and power driven means for rotating the members to produce a movement of the mesh.

15. In a machine for making mesh in the form of a sleeve, a pair of cylindrical supports for the mesh mounted with their axes in parallel relation and adjustable toward and away from each other, a driven cylinder associated with each support and adapted to engage and move the mesh on the supports, these driving members being relatively adjustable as the supports are relatively adjusted, and a shield enclosing the sleeve of mesh and having apertures through which the driving members engage the mesh.

16. In a machine for making line mesh, a pair of relatively adjustable cylindrical supports for the sleeve of mesh disposed with their axes in parallel relation, and a pair of shield-like members having telescoping portions whereby these members may be adjusted as the supports are given different positions, these shield-like members being so formed as to enclose the sleeve while exposing portions thereof on the supports.

17. In a machine for making link mesh in the form of a sleeve, a pair of cylindrical supports for the mesh disposed with their axes in parallel relation and adjustable toward and away from each other, a pair of telescoping shield-like members enclosing the mesh and having apertures through which a portion of the sleeve is exposed on either support and cylindrical driven members adapted to engage the exposed portions of the mesh to move it on the supports.

18. A machine for making mesh in the form of a sleeve comprising a pair of rotatable cylindrical supports for a sleeve of mesh mounted with their axes parallel, one of these supports being adjustable to and away from the other, a cylindrical member associated with each support and adapted to engage the piece of mesh thereon, link-forming tools for forming and adding links to the piece of mesh carried on said supports and means for simultaneously rotating the cylindrical members with a step-wise movement including a ratchet on the fixed support, a power actuated pawl for advancing this ratchet, a gear on this support, a gear on the movable support and driving connections between the gears.

19. A machine for making mesh in the form of a sleeve comprising a pair of rotatable cylindrical supports for a sleeve of mesh mounted with their axes parallel, one of these supports being adjustable to and away from the other, a cylindrical member associated with each support and adapted to engage the piece of mesh thereon, link-forming tools for forming and adding links to the piece of mesh carried on said supports and means for simultaneously rotating the cylindrical members with a step-wise movement including a ratchet on the fixed support, a power actuated pawl for advancing this ratchet, a gear on this support, a gear on the movable support, a gear intermediate the supports driven from the gear on the fixed support, a slotted link mounted on the shaft of the intermediate gear, and an idler gear mounted on this link and serving to transmit the movement of the intermediate gear to the gear on the movable cylindrical member.

In testimony whereof I affix my signature.

RICHARD HATLEY BERKLEY.